Patented Sept. 4, 1923.

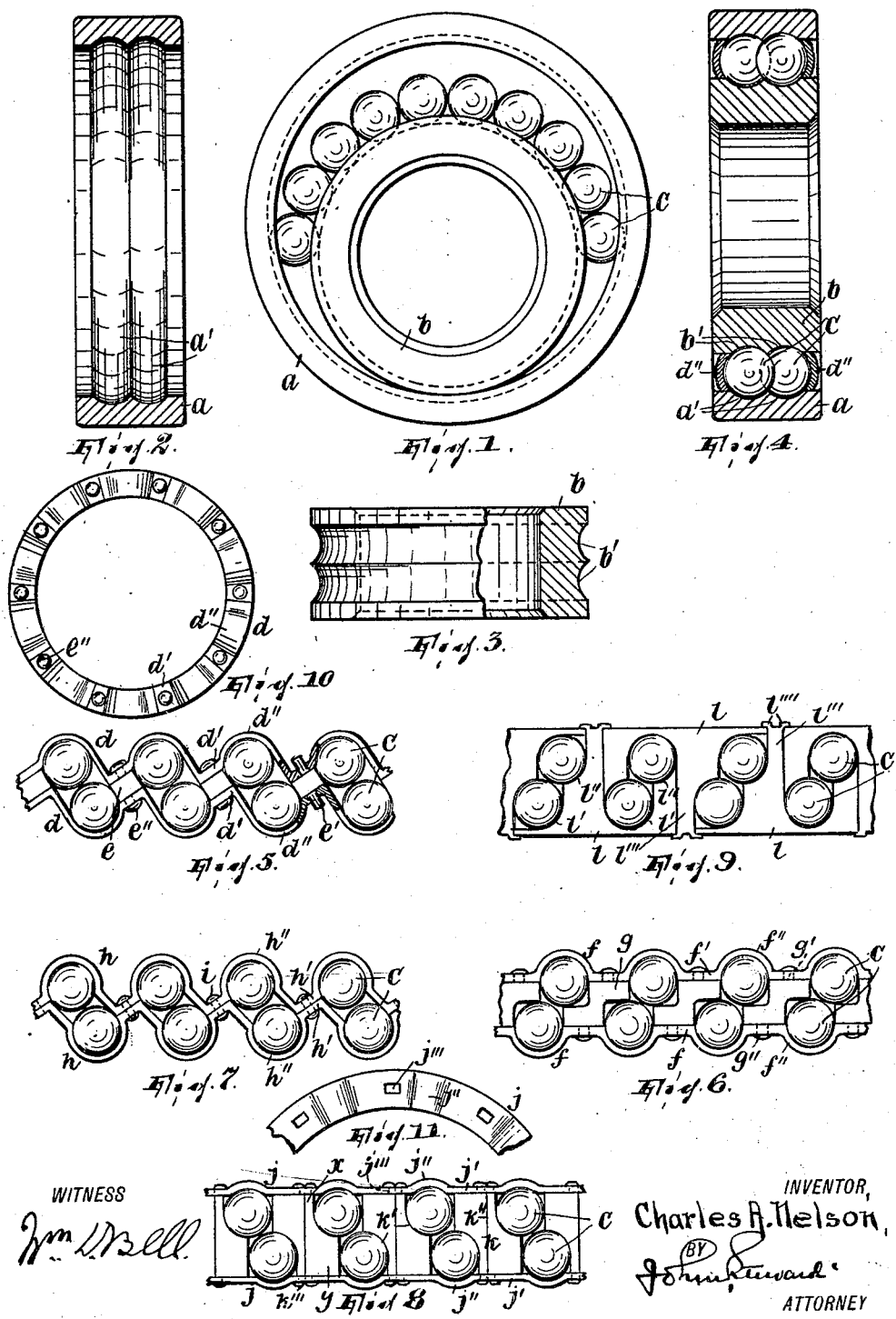

1,467,063

UNITED STATES PATENT OFFICE.

CHARLES A. NELSON, OF UTICA, NEW YORK.

ANTIFRICTION BEARING.

Application filed December 31, 1921. Serial No. 526,205.

*To all whom it may concern:*

Be it known that I, CHARLES A. NELSON, a citizen of the United States, residing at Utica, in the county of Oneida and State of New York, have invented certain new and useful Improvements in Antifriction Bearings, of which the following is a specification.

This invention relates to anti-friction bearings and particularly to anti-friction bearings of the type in which the anti-friction elements are arranged in more than one row around the axis of the bearing. The principal object of the invention is to provide a bearing of the particular type indicated in which the anti-friction elements, as balls, may have ample diameter and yet the so-called "cage" for keeping said elements separated may present sufficient thickness of material between such elements to give the cage adequate strength and durability. Other objects of invention relate to improvements in the construction of cages for anti-friction bearing in general, having especially in view facility in assembling the parts, simplicity of construction and reduction of the cost of manufacture.

In the drawing,

Figure 1 is a side elevation of the inner and outer races of an anti-friction bearing and of the anti-friction elements therebetween in the positions the several parts are made to occupy at the inception of the assembling operation;

Figures 2 and 3 are a transverse sectional view and a side elevation partly in section of the outer and inner races;

Figure 4 is a transverse sectional view of the assembled bearing structure, illustrating a cage such as appears in Fig. 5, for example;

Figures 5, 6, 7, 8 and 9 are fragmentary plans of the anti-friction elements and different forms of cages;

Figure 10 is a side elevation, on a smaller scale, of the cage shown in Fig. 5; and Figure 11 shows a detail of Fig. 8.

$a$ and $b$ denote the outer and inner races, and $c$ the anti-friction elements, here shown as balls. The balls are arranged around the axis of rotation in two circumferential rows, one sufficiently offset laterally with respect to the other so that the balls in each row somewhat overlap a plane perpendicular to said axis. The races have continuous grooves $a'$ $b'$ confining the rows of elements to move in paths in which those in each row constantly overlap said plane and are offset laterally with respect to those in the other.

The cage for separating the balls is constructed so as to partition them off in pairs from each other, each pair being composed of one ball from each row, and so as further to space such pairs from each other further than the components of each pair are spaced from each other; in other words, said cage is constructed so that in separating the balls it maintains the balls of each row staggered with reference to those of the other and staggered, moreover, so that viewed laterally or viewed in plan the balls of each row are off the centers between the balls of the other row. Different forms of cages embodying this construction and certain other features will be now described in detail:

In Fig. 5 (see also Fig. 10) the cage comprises two reverse counterpart rings $d$ and rectangular blocks $e$ intervening between them. Each ring is appreciably thinner viewed from a point radial thereof than it is viewed laterally, this latter dimension being preferably such that when the ring is in place between the races $a$ and $b$ (Fig. 4) it will fit fairly snugly the intervening space. Viewed edgewise each ring has a series of parallel and oblique walls $d'$ and, alternating with and connecting said walls, the curved bearing walls $d''$. (Each wall $d''$ may as viewed in the radial section of the ring be also curved, at least at the inside— see Fig. 4). For securing the two rings and intervening blocks $e$ together—the blocks intervening specifically between the portions $d'$ of the rings—I may provide studs $e'$ projecting from both lateral faces of some or all of the blocks and cause them to penetrate suitable holes in the portions $d'$ of the rings and then upset or rivet the protruding ends of the studs as shown in Fig. 5 at $e''$. In Fig. 6 there are also reverse counterpart rings $f$ and blocks $g$ intervening between them. Each ring is here also appreciably thinner viewed from a point radial thereof than it is viewed laterally. But in this case it comprises a series of alined walls $f'$ and, alternating with and connecting said walls, the curved bearing walls $f''$. The blocks $g$ in this instance are Z-shaped and may have stud $g'$ protruding laterally from both faces thereof through the rings in such manner that their free ends may be upset or riveted, as at $g''$, to secure the rings and blocks together.

In both Figs. 5 and 6 the blocks $e$ and $g$, it will be observed, as well as the curved portions of said ring, afford bearings for the balls $c$. In Fig 7, in which the construction is somewhat similar to Fig. 5, the blocks are omitted and the rings $h$ have their oblique walls $h'$, intervening between the curved bearing walls $h''$, directly connected by rivets $i$. In Fig. 8 the construction is somewhat similar to Fig. 6 in that the rings $j$ have alined walls $j'$ and intervening curved walls $j''$ (though somewhat shallower than the curved walls $f''$ in Fig. 6) and in that the blocks $k$ are of the same general shape as in Fig. 6, though with concave curves $k'$ affording bearings for the balls instead of the angular recesses affording the bearings for the balls in Fig. 6; but each block $k$ is divided in a radial plane $k''$ into two sections, and each section has on each lateral face thereof near such plane a stud $k'''$, each two adjoining studs of each two adjoining sections being adapted to enter into and fit a preferably rectangular hole $j'''$ in the ring $j$. It will be noted that each section of the block, by dividing it as stated, is in plan appreciably thinner at one side, as at $x$, than it is at the other, as at $y$, the part $x$ forming a tongue that by acting wedge-fashion facilitates assembling, as will be explained.

In Fig. 9 the rings are omitted and the cage is composed of reverse counterpart sections $l$. Each section, viewed in plan, has two pairs of steps $l'$ $l''$, affording bearings for the balls, in which one pair is offset circumferentially with relation to the other but in which the two steps $l'$ are offset axially with respect to the two steps $l''$ the same distance as the grooves $a'$ $b'$ of the races are thus offset; and between the two pairs of steps is a laterally projecting tongue $l'''$ whose free end may be split, as at $l''''$, to form a split-rivet which as shown will when expanded or upset overlap the faces of two other such but opposite sections between which the section in question is interposed.

The proper number of balls $c$ for each row being interposed between the races the cage parts in Figs. 5 and 7 are brought together from opposite sides of the races so as to pocket the balls in the various recesses formed by the curved walls of the rings, preferably having first connected the blocks in Fig. 5 either all with one ring or some with one ring and some with the other, the studs are entered in the holes in the rings and then riveted; in Fig. 6, the blocks $g$ are introduced between the pairs of balls, and then the rings applied and riveted to the blocks; in Fig. 8, the two sets of sections may be conveniently secured by the rivets to the respective rings and then the rings, carrying such sections, applied from opposite sides of the races, the sections of one set sliding on those of the other and their wedge-portions $x$ acting to facilitate the separation by wedging the balls apart, whereupon the sections on one ring are riveted to the other; and in Fig. 9, the one set of sections may be first applied and then those of the other, the two sets being finally riveted together. In Fig. 9 each portion $l'''$ acts wedge-fashion to separate the balls. (The wedging action, on entering the cage members, also applies to Figs. 5 and 7.)

It is not indispensable that the cage structure have as a part thereof means for securing its component parts together or in operative relation to the rolling elements, although such means is a part of said structure in the examples herein given.

By arranging the rows of elements $c$ staggered and so that those in each row project into the circumferential path followed by those in the other, and, further, by providing a cage so formed that it holds the pairs of elements, one from each row, separated pair for pair further than the elements in each pair are apart, the rolling elements may be made larger than is possible in ordinary pluri-row bearings and the cage have adequate thickness and hence strength between the pairs of balls.

Having thus fully described my invention, what I claim as new and desire to secure by Letters Patent is:—

1. An anti-friction bearing including two continuous coaxial races, two continuous and side-by-side rows of rolling elements confined between and by said races to coaxial paths and with the elements in each row projecting into the path of the other row, and a cage having means to hold pairs of the rolling elements, one element from each row, separated each pair from the next further than the elements in each pair are apart.

2. An anti-friction bearing including two continuous coaxial races, rolling elements arranged between said races, and a cage having means to hold said elements in two side by side continuous rows coaxial with the races and with the elements in each row projecting into the path of rolling of the other row and with said elements arranged in pairs, one element from each row, separated each pair from the next further than the elements in each pair are apart.

In testimony whereof I affix my signature.

CHARLES A. NELSON.